Patented Nov. 29, 1932

1,889,279

UNITED STATES PATENT OFFICE

WILHELM ECKERT AND OTTO BRAUNSDORF, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFFS AND PROCESS OF PREPARING THEM

No Drawing. Application filed May 29, 1929, Serial No. 367,114, and in Germany June 18, 1928.

The present invention relates to vat dyestuffs and a process of preparing them.

In U. S. Patents No. 1,588,451 dated June 15, 1926, No. 1,690,775 dated November 6, 1928, No. 1,765,661 dated June 24, 1930, and No. 1,765,662 dated June 24, 1930, a new class of vat dyestuffs has been disclosed obtainable by condensing 1.4.5.8-naphthalene-tetra-carboxylic acid or its dianhydride or substitution products thereof with ortho-diamines or salts thereof in the presence or absence of solvents or diluents. These dyestuffs are mixtures of compounds of the following general formulæ:

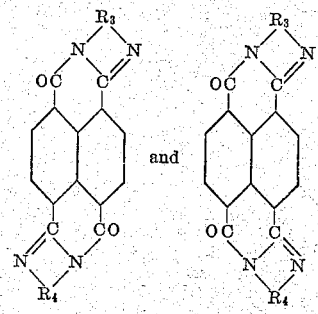

wherein $R_3$ and $R_4$ stand for an unsubstituted or substituted arylene. By the said process there can, however, be obtained only vat dyestuffs in which $R_3$ and $R_4$ represent the same aryl group in each derivative of this class.

Now we have found that new vat dyestuffs of the type described in the opening paragraph of this specification in which the aryl groups $R_3$ and $R_4$ are different from one another are obtainable by condensing a naphthoylene-aryl-imidazol-peri-dicarboxylic anhydride of the following general formula:

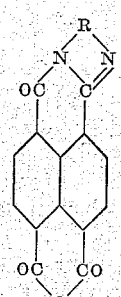

wherein R stands for a substituted or unsubstituted aromatic group bound in two adjacent positions, with an aromatic ortho-diamine. The condensation is effected by mixing the components, advantageously in the presence of a solvent such as glacial acetic acid, nitrobenzene, water or the like, and heating the reaction mixture. Instead of the above mentioned peri-dicarboxylic anhydride the corresponding free carboxylic acids can, of course, likewise be used.

By the said process new vat dyestuffs of the following probable formula are obtainable:

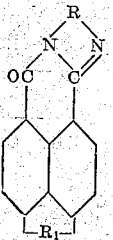

wherein $R_1$ stands for the bivalent radical

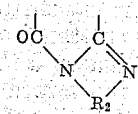

and R and $R_2$ for a nucleus of the group consisting of benzene, naphthalene and acenaphthene, which may contain substituents and is bound in two adjacent positions to the nitrogen atom, but R being different from $R_2$.

In some cases the new dyestuffs are obtained as mixtures of isomeric dyestuffs, in other cases they are obtained as uniform products having the constitution of one of the possible isomers.

The new dyestuffs dye the cotton fiber from the vat tints of excellent fastness properties.

The naphthoylene-aryl-imidazol-peri-dicarboxylic acids and anhydrides thereof, respectively, may be obtained, for instance, by the process disclosed in our co-pending application Serial No. 367,113 of even date.

The following examples serve to illustrate our invention but they are not intended to limit it thereto, the parts being by weight:

(1) 3.4 parts of naphthoylene-benzimidazol-peri-dicarboxylic acid or its anhydride, respectively, obtainable according to the process disclosed in our co-pending U. S. patent application last referred to are heated to gentle boiling with 1.4 parts of 1.2-dimethyl-4.5-diamino-benzene in about 10 times their weight of glacial acetic acid and boiling is continued until the precipitation of the dyestuff is finished. The reaction takes the following course:

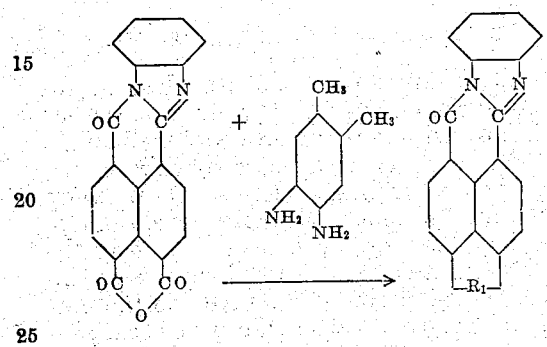

wherein $R_1$ stands for

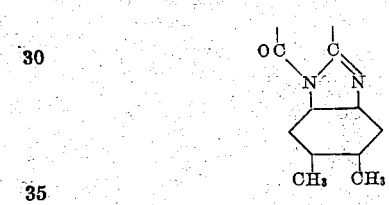

The dyestuff is filtered with suction, washed with glacial acetic acid, ethylalcohol and water. It is a brownish-red powder which dissolves in concentrated sulfuric acid to a red solution. It dyes cotton from a green hydrosulfite vat which has in a thick layer and by reflected light a red appearance, copper-red tints of good fastness properties.

(2) When heating 3.4 parts of naphthoylene-benzimidazol-peri-dicarboxylic acid or its anhydride in about 10 times their weight of glacial acetic acid with 1.6 parts of 1.2-diamino-naphthalene, the condensation product separates after a short time as a brown crystalline precipitate. It is filtered with suction, washed and dried and thus a dyestuff of one of the following probable formulæ:

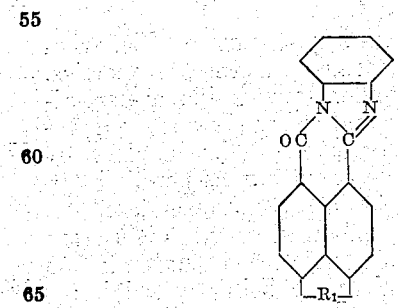

wherein $R_1$ stands for the bivalent radicals

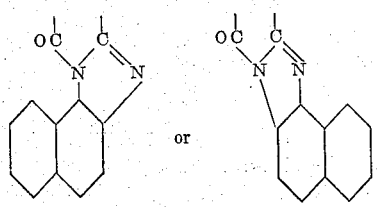

is obtained as a brown powder yielding with caustic soda solution and hydrosulfite an olive green vat which dyes cotton fast brown tints. Instead of glacial acetic acid there may also be used with the same result other solvents such as nitrobenzene or the like; the condensation may also be effected by fusing the two components in the absence of a solvent.

(3) By condensing the naphthoylene-benzimidiazol-peri-dicarboxylic acid with ortho-phenylenediamine, according to the following equation:

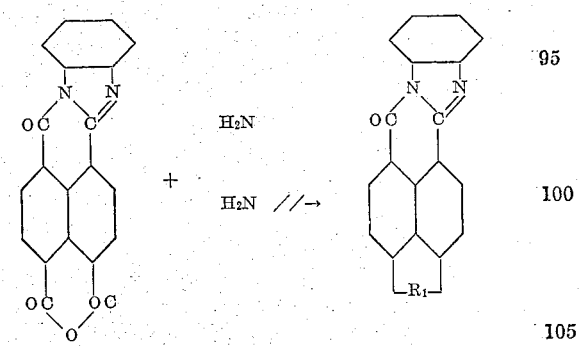

wherein $R_1$ stands for

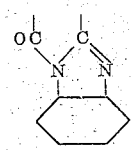

the same dyestuff is obtained as by condensing 1.4.5.8-naphthalene-tetra-carboxylic acid with ortho-phenylene-diamine according to the process disclosed in U. S. Patent No. 1,588,451. It has exactly the same properties as the dyestuffs described in that patent.

(4) By condensing in the manner described in the preceding examples 3.4 parts of naphthoylene - benzimidazol - peri - dicarboxylic anhydride with 1.3 parts of 3.4-di-amidotoluene, a red dyestuff is obtained which dyes cotton from an olive green hydrosulfite vat red tints of goods fastness properties. The reaction proceeds according to the following formulæ:

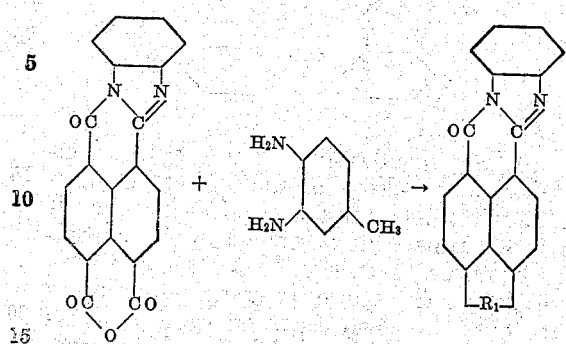

wherein R₁ stands for

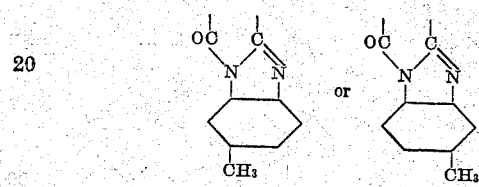

(5) When starting from the naphthoylene-methyl-benzimidazol-peri-dicarboxylic acid—which can be obtained by treating according to the process described in our co-pending U. S. application last referred to the condensation product obtainable from naphthalene-4.5-diethyl-indandion-1.8-dicarboxylic anhydride and 3.4-diamino-toluene—and treating it with 1.2-diamido-benzene, a dyestuff is obtained having the same properties as that described in Example 4. The reaction takes the following course:

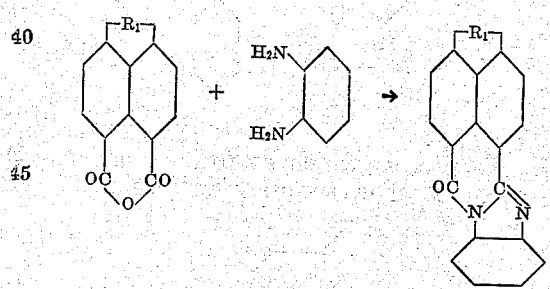

wherein R₁ stands for

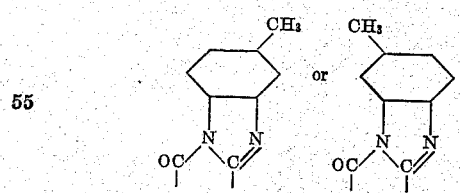

(6) By dispersing 3.4 parts of naphthoylene-benzimidazol-peri-dicarboxylic anhydride and 1,6 parts of 1-ethoxy-3.4-aminobenzene in about 10 times their weight of glacial acetic acid and heating the mixture to boiling for some time, the condensation product obtained according to the following equation:

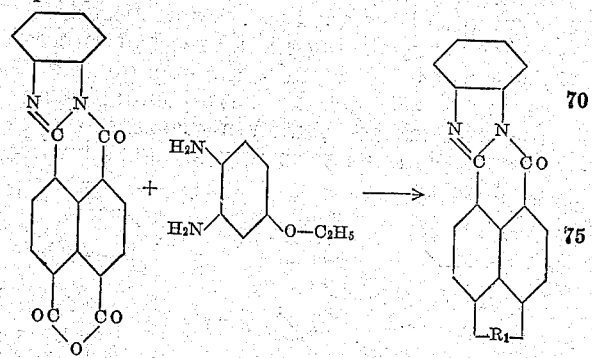

wherein R₁ stands for

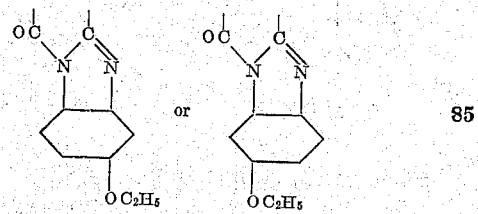

separates as a brown precipitate. The dyestuff, after being isolated in the usual manner, is a brown powder and dyes the cotton fiber from an olive brown alkaline hydrosulfite vat brown tints of good fastness properties.

(7) 3.4 parts of naphthoylene-benzimidazol-peri-dicarboxylic anyhride are heated to gentle boiling in a mixture of 20 parts of nitrobenzene and the equal quantity of glacial acetic acid and then a solution of 1.5 parts of 4-chloro-1.2-diaminobenzene in glacial acetic acid is added. After a short time the condensation product obtained according to the following equation:

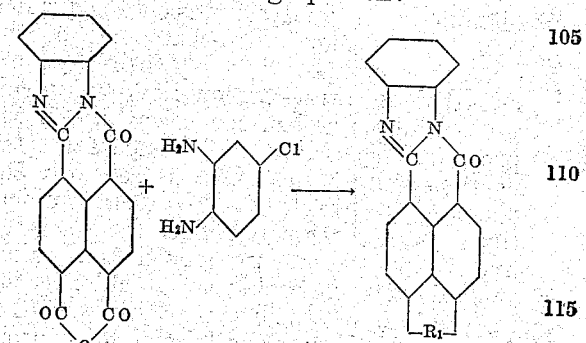

wherein R₁ stands for

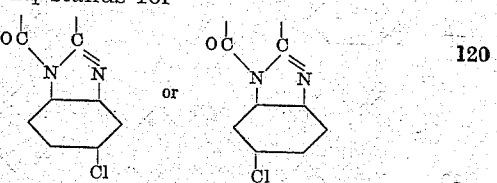

separates as a red crystalline precipitate. It is filtered with suction, washed with glacial acetic acid, ethyl alcohol and water. The dyestuff thus obtained is in a dry state a red fine crystalline powder which dissolves in concentrated sulfuric acid to a yellow-red solution and dyes cotton from an olive green vat red tints of good fastness properties.

(8) By replacing in the reaction process described in Example 7 the 4-chloro-1.2-diamino-benzene by the corresponding quantity of 4-bromo-1.2-diamino-benzene, a dyestuff is obtained according to the following equation:

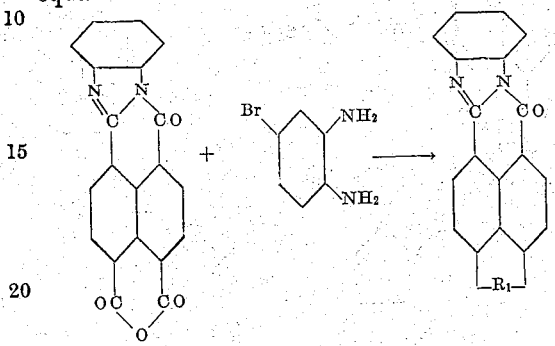

wherein $R_1$ stands for

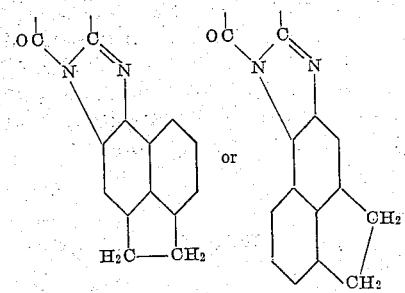

It dyes cotton from an olive green hydrosulfite vat red brown tints.

Its fastness properties are very similar to the chlorine containing dyestuff obtained according to Example 7.

(9) By condensing in a mixture of nitrobenzene and glacial acetic acid 3.5 parts of naphthoylene-benzimidazol-peri-dicarboxylic anhydride with 1.6 parts of 4-nitro-1.2-diamino-benzene a dyestuff is obtained which represents a mono-nitro-compound of the dyestuff obtainable by condensing 1.4.5.8-naphthalene-tetra-carboxylic dianhydride with 1.2-diamino-benzene according to the processes disclosed in the U. S. patent specifications and applications referred to in the opening paragraph of the present application. It dyes the cotton fiber from a green hydrosulfite vat intense gray tints of fairly good fastness to washing. On chlorination the gray color turns brown. The dyestuff is formed according to the following equation:

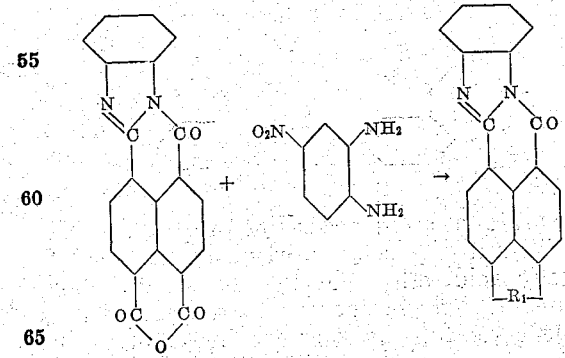

wherein $R_1$ stands for

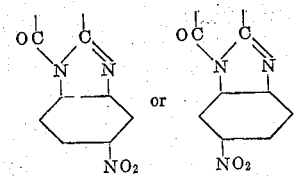

(10) By condensing naphthoylene-benzimidazol-peri-dicarboxylic acid or its anhydride with 3.4-diaminoacenaphthene according to the methods described in the preceding examples a dyestuff is obtained which dyes cotton from an olive green hydrosulfite vat covered brown tints of good fastness properties. The dyestuff is formed according to the following equation:

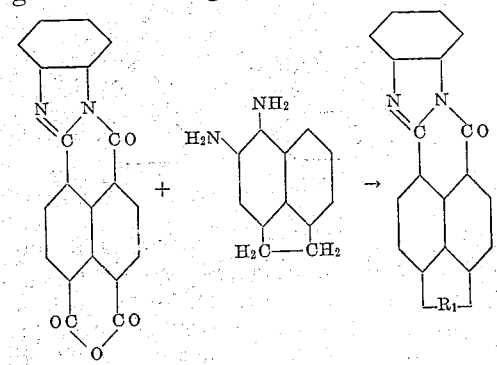

wherein $R_1$ stands for

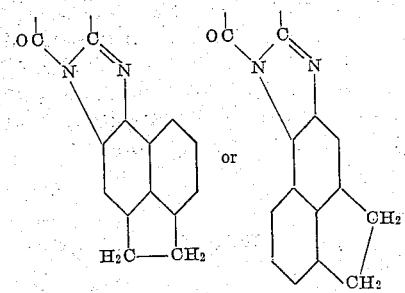

We claim:
1. The process which comprises condensing a compound of the following formula:

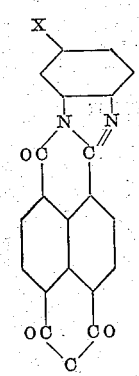

wherein X stands for hydrogen or methyl, with an aromatic ortho-diamine of the group consisting of those of the benzene, naphthalene and acenaphthene series while heating in the presence of an inert diluent.

2. The process which comprises condensing a compound of the following formula:

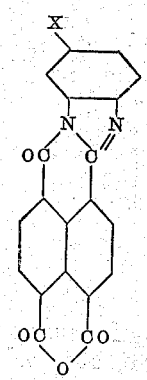

wherein X stands for hydrogen or methyl, with an aromatic ortho-diamine of the group consisting of those of the benzene naphthalene and acenaphthene series while heating to boiling temperature in the presence of glacial acetic acid.

3. The process which comprises condensing naphthoylene-benzimidazol-peri-dicarboxylic anhydride with an aromatic ortho-diamine of the group consisting of those of the benzene, naphthalene and acenaphthene series while heating in the presence of an inert diluent.

4. The process which comprises condensing naphthoylene-benzimidazol-peri-dicarboxylic anhydride with an aromatic ortho-diamine of the group consisting of those of the benzene, naphthalene and acenaphthene series while heating to boiling temperature in the presence of glacial acetic acid.

5. The process which comprises condensing naphthoylene-benzimidazol-peri-dicarboxylic anhydride with an ortho-diamine of the group consisting of those of the naphthalene and benzene series wherein the benzene nucleus may be substituted in 4-position by methyl, ethoxy halogen or the nitro group, while heating in the presence of an inert diluent.

6. The process which comprises condensing naphthoylene-benzimidazol-peri-dicarboxylic anhydride with an ortho-diamine of the group consisting of those of the naphthalene and benzene series wherein the benzene nucleus may be substituted in 4-position by methyl, ethoxy halogen or the nitro group, while heating to boiling temperature in the presence of glacial acetic acid.

7. The process which comprises condensing naphthoylene-benzimidazol-peri-dicarboxylic anhydride with 1.2-diamino-naphthalene while heating in the presence of an inert diluent.

8. The process which comprises condensing naphthoylene-benzimidazol-peri-dicarboxylic anhydride with 1.2-diamino-naphthalene while heating to boiling temperature in the presence of glacial acetic acid.

9. As new products, vat dyestuffs of the following probable formula:

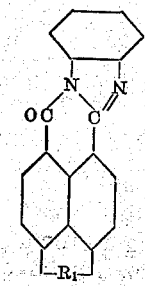

wherein $R_1$ stands for the bivalent radical:

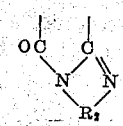

in which $R_2$ represents a nucleus of the group consisting of naphthalene and benzene which is substituted in 4-position by methyl, ethoxy, chlorine, bromine or the nitro group in each case bound in two adjacent positions to the nitrogen atoms which products are uniform dyestuffs or mixtures of isomeric dyestuffs, dyeing cotton from the vat very fast tints.

10. As a new product, a vat dyestuff of the following probable formula:

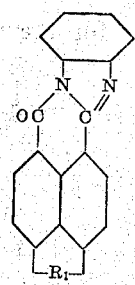

wherein $R_1$ stands for the bivalent radical:

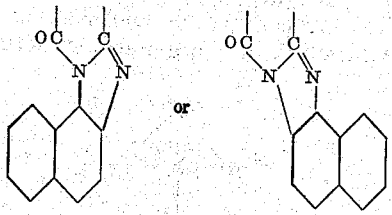

being a brown powder yielding with a caustic soda solution and hydrosulfite a red vat from which it dyes cotton fast claret tints.

11. As a new product, a mixture of isomeric vat dyestuffs of the following probable formula:

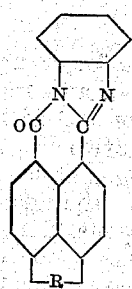

wherein R stands for the bivalent radical:

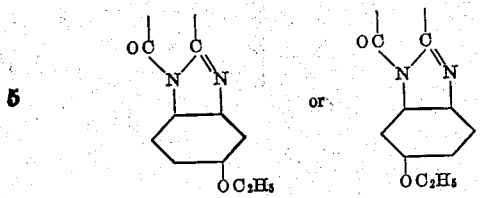

said product being a brown powder and dyeing the cotton fiber from an olive brown alkaline hydrosulfite vat brown tints of good fastness properties.

12. As a new product, a mixture of isomeric vat dyestuffs of the following probable formula:

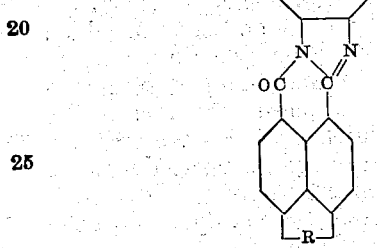

wherein R stands for the bivalent radical:

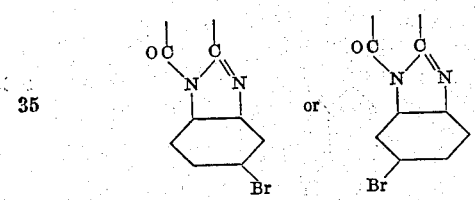

said product dyeing cotton from an olive green hydrosulfite vat red brown tints.

13. The process which comprises condensing a compound of the general structure:

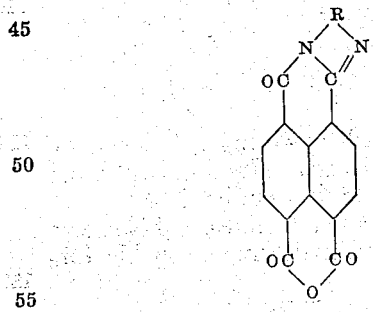

wherein R stands for an aryl radical of the group consisting of aryl radicals of the benzene, naphthalene and acenaphthene series, which is bound in two adjacent nuclear positions to the nitrogen atoms with an aromatic ortho-diamine of the group consisting of those of the benzene, naphthalene and acenaphthene series, while heating in the presence of an inert diluent.

14. The process which comprises condensing a compound of the general structure:

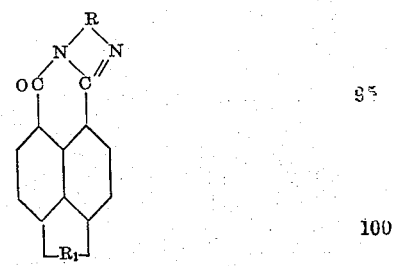

wherein R stands for an aryl radical of the group consisting of aryl radicals of the benzene, naphthalene and acenaphthene series, which is bound in two adjacent nuclear positions to the nitrogen atoms with an aromatic ortho diamine of the group consisting of those of the benzene, naphthalene and acenaphthene series, while heating to boiling temperature in the presence of glacial acetic acid.

15. As new products, the compounds of the probable general structure:

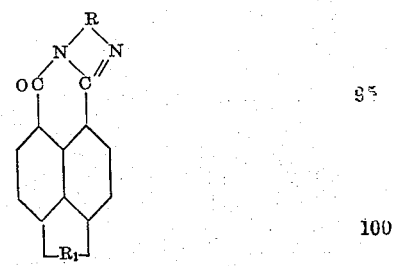

wherein R stands for an aryl radical of the group consisting of aryl radicals of the benzene, naphthalene and acenapthene series, which is bound in two adjacent nuclear positions to the nitrogen atoms and $R_1$ stands for the bivalent radical

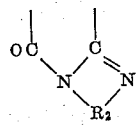

wherein $R_2$ represents an aryl radical of the group consisting of aryl radicals of the benzene, naphthalene and acenaphthene series, which is bound in two adjacent nuclear positions to the nitrogen atoms, $R_2$ being different from R, which products are uniform dyestuffs or mixtures of isomeric dyestuffs, dyeing cotton from the vat very fast tints.

In testimony whereof, we affix our signatures.

WILHELM ECKERT.
OTTO BRAUNSDORF.